United States Patent
Lee et al.

(10) Patent No.: US 6,728,864 B2
(45) Date of Patent: Apr. 27, 2004

(54) IDENTIFYING ARCHITECTURE AND BIT SPECIFICATION OF PROCESSOR IMPLEMENTATION USING BITS IN IDENTIFICATION REGISTER

(75) Inventors: Van Hoa Lee, Cedar Park, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 09/773,192

(22) Filed: Jan. 31, 2001

(65) Prior Publication Data

US 2002/0103989 A1 Aug. 1, 2002

(51) Int. Cl.[7] ............................................. G06F 15/76
(52) U.S. Cl. ......................... 712/200; 712/32; 712/220
(58) Field of Search .......................... 712/32, 220, 200

(56) References Cited

U.S. PATENT DOCUMENTS

| | | | | |
|---|---|---|---|---|
| 4,775,931 A | * | 10/1988 | Dickie et al. ................ 710/9 |
| 5,493,683 A | * | 2/1996 | Cloud et al. ................ 713/320 |
| 5,671,435 A | * | 9/1997 | Alpert ........................ 712/38 |
| 5,835,775 A | * | 11/1998 | Washington et al. ........ 717/153 |
| 5,958,037 A | * | 9/1999 | Dreyer et al. ................ 712/32 |
| 6,049,668 A | * | 4/2000 | Smith et al. ................ 717/138 |

* cited by examiner

Primary Examiner—Kenneth S. Kim
(74) Attorney, Agent, or Firm—Duke W. Yee; Mark E. McBurney; Wayne P. Bailey

(57) ABSTRACT

A method, system and program for architecturally identifying data processor implementations are provided. The invention comprises assigning a plurality of least significant bits in a processor's identification register to a unique value. This value can be assigned to these bits permanently during manufacture and is used to identify the bit specification for a specific processor implementation. The present invention can be generalized to include any processor architecture that comprises a plurality of instruction subsets for different bit specifications.

18 Claims, 1 Drawing Sheet

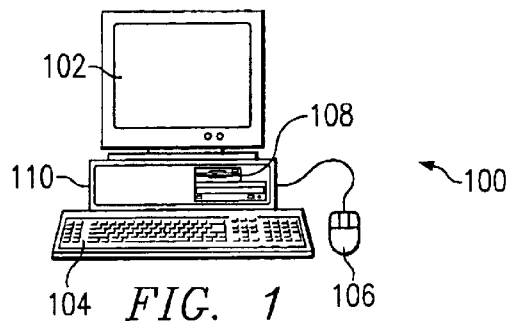
FIG. 1
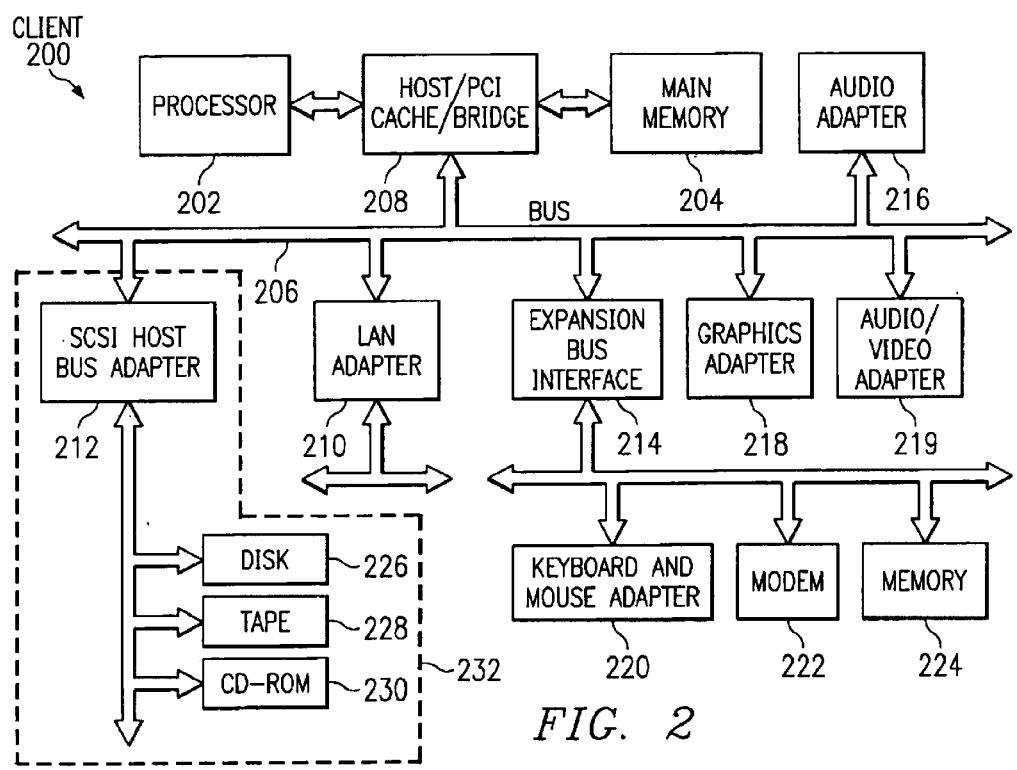
FIG. 2
FIG. 3A
FIG. 3B

IDENTIFYING ARCHITECTURE AND BIT SPECIFICATION OF PROCESSOR IMPLEMENTATION USING BITS IN IDENTIFICATION REGISTER

BACKGROUND OF THE INVENTION

1. Technical Field

The present invention relates to data processors. More specifically, the present invention relates to identifying processor implementations.

2. Description of Related Art

Processor architecture defines a Central Processing Unit ID (CPUID) or processor version number (PVR) to identify the specific hardware implementation of the architecture. Identifying the hardware implementation allows software developers to find out what the capabilities and performance level of the current machine are, in order to optimize software development. Bit specifications describe the amount of data that a CPU can compute at the same time, known as the register width. For example, if the clock rates are the same (300 MHz, 500 MHz, etc.) and the basic architectures are equal, a 64-bit computer works twice as fast internally as a 32-bit computer.

Current architectures may define an instruction set for 32-bit and 64-bit implementations within a given processor. For example, if a software developer wants to write a portable software which fully utilizes 64-bit subset instructions for the 64-bit implementation of the architecture, the developer may have to account for all existing 64-bit processors. The software developer may also have to make changes to support any new processor implementations when they become available. The developer accomplishes this task by obtaining the list of PVRs for all 64-bit processors, and then checking the PVR of the current processor running the software to see if the PVR is on the list. The software developer only knows the list of announced processors or pre-announced processors. If the processor developer comes up with a new generation chip in the future, the software developer will need an updated list.

The software developer needs to maintain the list of all existing 64-bit processors of the architecture to utilize any 64-bit feature of the 64-bit implementation. If an architecture defines both 32-bit and 64-bit implementations, and a processor is not on the 64-bit list, then it is a 32-bit processor implementation. All implementations of the architecture always support the lowest common set of instruction, in this case, the 32-bit instruction set. Therefore, if a processor is a 64-bit implementation, it must support the 32-bit instructions as the base subset. With only 32-bit or 64-bit width, one 64-bit list is sufficient. If there are four widths (i.e. 32-, 64-, 128-, and 256-bit), then three lists may be needed for the higher bit-width processors (64-, 128-, and 256-bit).

Currently, there is no permanent way to query the implementation of any existing processor. Instead, software developers have to maintain the list of CPUIDs or PVRs and update the code for future processors. Therefore, it would be desirable to have a method and apparatus for architecturally identifying which implementation is being used in a processor.

SUMMARY OF THE INVENTION

The present invention provides a method, system and program for architecturally identifying data processor implementations. The invention comprises assigning a plurality of least significant bits in a processor's identification register to a unique value. This value can be assigned to these bits permanently during manufacture and is used to identify the bit specification for a specific processor implementation. The present invention can be generalized to include any processor architecture that comprises a plurality of instruction subsets for different bit specifications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a data processing system in which the present invention may be implemented;

FIG. 2 depicts a block diagram of a data processing system in which the present invention may be implemented;

FIG. 3A depicts a table illustrating the use of CPUID bits to architecturally identify a 32-bit processor implementations in accordance with the present invention; and FIG. 3B depicts a table illustrating the use of CPUID bits to architecturally identify a 64-bit processor implementations in accordance with the present invention.

DETAILED DESCRIPTION OF THE PREFERRED EMBODIMENT

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

Processor architecture defines CPUID or PVR to identify the specific hardware implementation of the architecture. (In the present specification, the terms CPUID and PVR are treated as equivalent.) The present invention provides a mechanism to architecturally identify which implementation of a processor is being used. Thus software developers will have a permanent method to identify any specific implementation of the architecture. Instead of assigning a complete unique ID to each implementation, the present invention calls on the processor architecture to use some least significant bits of the ID register for the purpose of indicating the bit specification of that particular processor implementation.

If the CPUID or PVR is a 16-bit register, the least two significant bits may be set aside and used to convey the register width information. With the present invention, the CPUID/PVR list is no longer needed, and the exact value of the CPUID is not needed. Only the bits within the CPUID register (e.g. bit0 and bit1) used to convey the implementation is what the developers will be looking for. The CPUID register will be programmed permanently to a unique ID value during manufacturing. Even though the ID value has not been completely assigned, the ID(0) and ID(1) will be controlled and pre-assigned with the register width information. The unique ID may provide user friendly information such as, for example, the processor is PowerPC 604 or POWER-3 630.

The present invention can be generalized to any processor architecture with a plurality of instruction subsets of 32-bit, 64-bit, 128-bit, 256-bit, etc. The following is an example of using the two least significant bits of the CPUID or PVR for encoding the width:

ID[1,0]=00 for 32-bit register
ID[1,0]=01 for 64-bit register
ID[1,0]=10 for 128-bit register
ID[1,0]=11 for 256-bit register The CPUID identifies the general processor hardware as well as the implementation within the processor. Instead of using the entire CPUID value, the present invention takes two bits from the general assignment and gives specific meaning to the implementation. If the processor architecture also allows implementations with different widths for built-in floating point processors, additional bits can be used to encode the floating point register width as well. For example, some PowerPC processors have 64-bit floating point registers with both 32-bit (single) and 64-bit (double) floating point instructions. Some PowerPC processors only have 32-bit floating point registers and instructions. By applying the present invention, the processor developer may choose to use ID[3,2] to convey the implementation of the built-in floating point processor.

Referring now to FIG. 3A, a table illustrating the use of CPUID bits to architecturally identify a 32-bit processor implementations is depicted in accordance with the present invention. This example assumes that the CPUID is a 16-bit register using the little-endian bit notation. FIG. 3A depicts the CPUID register as having a binary value of 0000000000000000. Because the CPUID register has CPUID[1,0]=00, the register is immediately identified as being a 32-bit implementation of its processor architecture (i.e. a 32-bit processor). While the other bits of the CPUID can be either 0 or 1, CPUID[1,0] are always set to 00 and remain unchanged. Therefore, 32-bit processors will take CPUID values which are multiples of four (i.e. 0, 4, 8, 12, 16, etc.).

Referring now to FIG. 3B, a table illustrating the use of CPUID bits to architecturally identify a 64-bit processor implementations is depicted in accordance with the present invention. The CPUID value is equal to 0x0001 in hexadecimal or 1 in decimal. This value is for a 64-bit processor since CPUID[1,0] are always set to 01. In mathematical terms, the CPUID or PVR value is a multiple of four plus one (i.e. 1, 5, 9, 13, etc.). If the architecture is not yet defining 128-bit or 256-bit instruction sets, those values of CPUID or PVR will be reserved for future architectural extension.

The present invention provides software developers with a permanent way to query the implementation of any existing processor or future ones, and a better way to utilize the 64-bit instruction subset only available to 64-bit processors, or the 128-bit instruction subset available to 128-bit processors. Without architectural definition, developers have to maintain the list of CPUID or PVR and update the code for future processors. The invention provides the mechanism to group the CPUIDs so that an easy, simple, and permanent way can be derived to identify the implementations for both existing processors and any future processors whose exact CPUID value are not yet known.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for architecturally identifying data processor implementations, comprising:

defining a data processor architecture by means of an identification register within a processor; and assigning a set of bits within the identification register to a unique value, wherein the assigned bits within the identification register identify both the data processor architecture and a bit specification of the processor implementation.

2. The method according to claim 1, wherein the bit specification defines bit width of processor registers.

3. The method according to claim 1, wherein the two least significant bits in the identification register identify the bit specification for the processor implementation, including width of the identification register itself.

4. The method according to claim 1, wherein the bits identifying the processor implementation are assigned permanently during manufacture.

5. The method according to claim 1, wherein additional bits in the identification register are assigned to identify a bit specification for a built-in floating-point processor.

6. The method according to claim 1, wherein the processor architecture comprises a plurality of instruction subsets for different bit specifications.

7. A system for architecturally identifying data processor implementations, comprising:

an identification register within a processor for defining a data processor architecture; and a set of bits, within the identification register, assigned to a unique value, wherein the assigned bits within the identification register identify both the data processor architecture and a bit specification of the processor implementation.

8. The system according to claim 7, wherein the bit specification defines bit width of processor registers.

9. The system according to claim 7, wherein the two least significant bits in the identification register identify the bit specification for the processor implementation, including width of the identification register itself.

10. The system according to claim 7, wherein the bits identifying the processor implementation are assigned permanently during manufacture.

11. The system according to claim 7, wherein additional bits in the identification register are assigned to identify a bit specification for a built-in floating-point processor.

12. The system according to claim 7, wherein a processor architecture comprises a plurality of instruction subsets for different bit specifications.

13. A computer program product in a computer readable medium, for architecturally identifying data processor implementations, the computer program product comprising:

instructions for defining a data processor architecture by means of an identification register within a processor; and instructions for assigning a set of bits within the identification register to a unique value, wherein the assigned bits within the identification register identify both the data processor architecture and a bit specification of the processor implementation.

14. The computer program product according to claim 13, wherein the bit specification defines bit width of processor registers.

15. The computer program product according to claim 13, wherein the two least significant bits in the identification register identify the bit specification for the processor implementation, including width of the identification register itself.

16. The computer program product according to claim 13, wherein the bits identifying the processor implementation are assigned permanently during manufacture.

17. The computer program product according to claim 13, wherein additional bits in the identification register are assigned to identify a bit specification for a built-in floating-point processor.

18. The computer program product according to claim 13, wherein a processor architecture comprises a plurality of instruction subsets for different bit specifications.

* * * * *